(12) United States Patent
Kwok et al.

(10) Patent No.: US 8,387,475 B2
(45) Date of Patent: Mar. 5, 2013

(54) CONTINUOUSLY VARIABLE TRANSMISSION

(75) Inventors: Yau Cheung Kwok, Shatin (HK); Miu Ling Mak, Shatin (HK)

(73) Assignee: Miu Ling MAK, Shatin (HK)

( * ) Notice: Subject to any disclaimer, the term of this patent is extended or adjusted under 35 U.S.C. 154(b) by 448 days.

(21) Appl. No.: 12/679,668

(22) PCT Filed: Dec. 29, 2007

(86) PCT No.: PCT/CN2007/071396
§ 371 (c)(1),
(2), (4) Date: Mar. 23, 2010

(87) PCT Pub. No.: WO2009/039709
PCT Pub. Date: Apr. 2, 2009

(65) Prior Publication Data
US 2010/0203990 A1    Aug. 12, 2010

(30) Foreign Application Priority Data

Sep. 24, 2007   (CN) .......................... 2007 1 0152960

(51) Int. Cl.
*F16H 29/04*   (2006.01)
(52) U.S. Cl. ............................... 74/112; 74/63; 74/125.5
(58) Field of Classification Search .................... 74/112, 74/125.5, 117, 120, 89.21; 280/236
See application file for complete search history.

(56) References Cited

U.S. PATENT DOCUMENTS

| | | | | |
|---|---|---|---|---|
| 4,487,085 A * | 12/1984 | Collins | ........................... | 74/113 |
| 5,029,486 A * | 7/1991 | Mercat | ............................ | 74/117 |
| 6,327,926 B1 * | 12/2001 | Chilman | ........................ | 74/117 |
| 6,447,421 B1 * | 9/2002 | Wren | ............................ | 475/170 |
| 6,807,878 B2 * | 10/2004 | Wren | ............................ | 74/125.5 |

* cited by examiner

*Primary Examiner* — David M Fenstermacher
(74) *Attorney, Agent, or Firm* — Kevin J. McNeely; McNeely, Hare & War LLP

(57) ABSTRACT

A continuously variable transmission comprises an input shaft and an output shaft, a drive wheel, a toothed wheel or a chain wheel, an endless sleeve, a ring wheel, at least one linking member, wedge teeth or a chain, wherein the drive wheel is provided with an annular recess in which a plurality of reversal wedge teeth run, and the wedge teeth are connected with a head portion of the linking member connected with the ring wheel, the spread of axles between the drive wheel and the ring wheel is adjusted via the swinging of the endless sleeve; and with the aid of the locking and releasing operations of the wedge teeth, the linking members are urged to drive the ring wheel, whereby changing the input and output transmission ratio. The continuously variable transmission can be used in a bicycle, wherein the spread of axles between the ring wheel and the drive wheel can be adjusted by regulating a wire, and the magnitude of speed variation is not restricted, the variation range is large, and the power could be synchronously input during the speed variation.

8 Claims, 5 Drawing Sheets

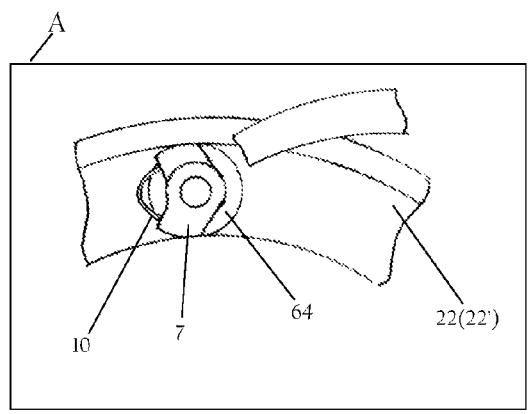 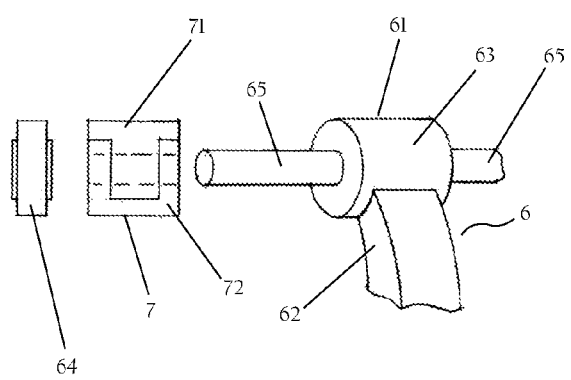
Fig. 3                              Fig. 4

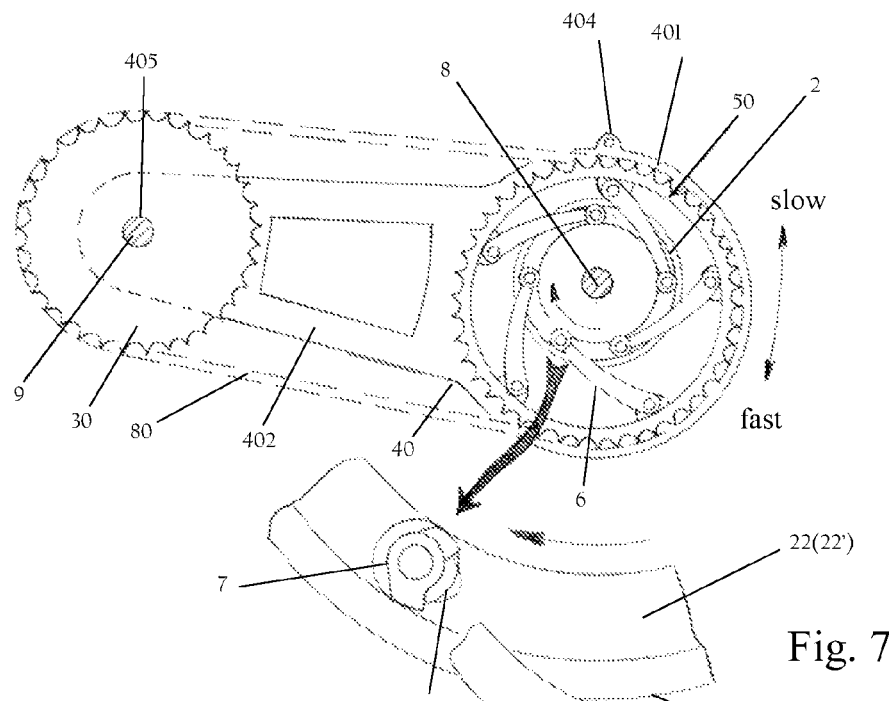
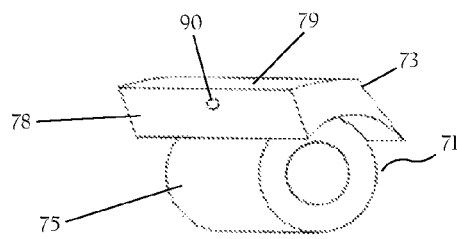
Fig. 5a
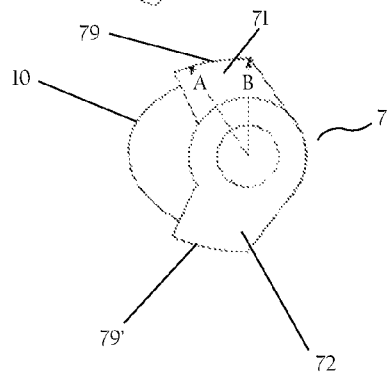
Fig. 7
Fig. 6
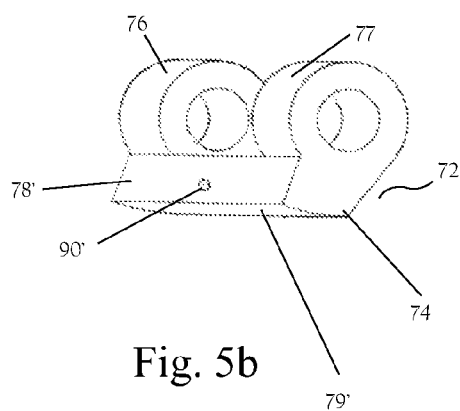
Fig. 5b

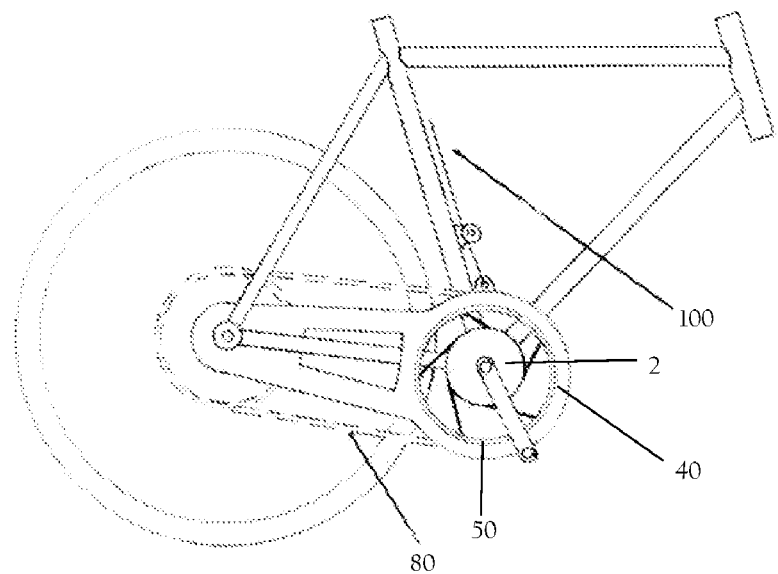
Fig. 8
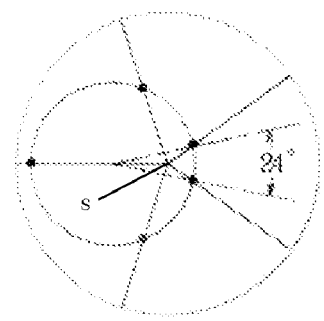    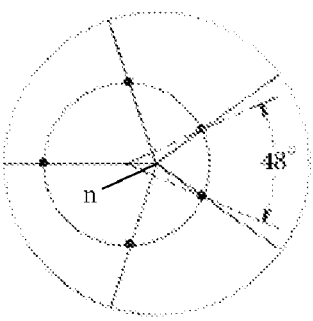    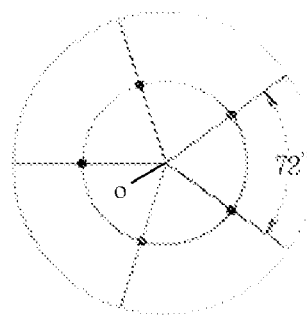
Fig. 9a      Fig. 9b      Fig. 9c

CONTINUOUSLY VARIABLE TRANSMISSION

TECHNICAL FIELD

The present invention relates to a transmission, and more particularly, a continuously variable transmission capable of a continuous and constant variation of a running speed thereof.

BACKGROUND OF THE INVENTION

In different kinds of motor vehicles, bicycles, machine equipments such as machine tools or the like, a transmission is widely used for altering input and output transmission ratios to attain a desired acceleration or deceleration.

A conventional transmission basically consists of different gears of various sizes. For example, a manual or an automatic transmission for a motor vehicle may provide a 4- to 5-speed transmission, in which each speed section needs to shift in a stepped manner, namely to shift from an upper section to a lower section and then from the lower section to a next section, such an operation process would be quite complicated, and sometimes a momentary failure might occur during the shifting process.

As far as a simple transmission for a bicycle is concerned, this transmission adopts usually a so-called conical pulley having a plurality of chain wheels of diameters varying in magnitude sequentially, the transferring of the chain among various chain wheels is quite unsmooth, resulting in a relatively long time for speed variation, and a failure might occasionally occur.

Among the commercially available continuously variable transmissions, a continuously variable transmission of belt-type is desirable, which is formed by having a belt covering on two wheels which are capable of changing the diameter of a V-shaped slot. This type of transmission has advantages of being simple in structure and easy in speed variation; but both ends of the belt are subject to a huge friction during operation, such that the belt is continuously bent and straightened to an extent, and thus prone to wearout and outbreak, even energy loss. Such a belt-type continuously variable transmission is not suitable for use in motor vehicles having a large horsepower.

SUMMARY OF THE INVENTION

An object of the present invention is to provide a continuously variable transmission capable of a smooth and continuous variation of an input and output transmission ratio thereof. The continuously variable transmission has its operation completely different from the conventional transmissions which transmit power through friction. The transmission of the invention allows to minimize the friction during the transmission of the power of its drive wheel.

To attain the above object, the present invention provides a continuously variable transmission comprising:

a support consisting of two bearer plates and a base plate;

a drive wheel acting as a primary wheel in round shape, which has an annular recess arranged near its periphery and is rotatably mounted at an upper portion of the bearer plate by an input shaft;

a toothed wheel acting as a driven wheel, which is rotatably mounted at a lower portion of the bearer plate by an output shaft;

an endless sleeve having an annular groove arranged on its inner circumferential surface, and a projecting lug or driving element and a mounting cannula protruding outwardly and located at corresponding upper and lower portions on its outer circumferential surface, respectively;

a ring wheel which is an annular external gear having on its outer peripheral surface a toothed portion with a relatively large diameter convex intermediate section and a relatively recessed supporting step having its both laterals with a diameter smaller than a root circle diameter of its toothed portion, and a plurality of perforated mounting bulges being evenly distributed on its inner peripheral surface; wherein the ring wheel is mounted in the endless sleeve and has its toothed portion inserted into the annular groove of the endless sleeve and meshed with toothed portion of the toothed wheel at the lower portion of the support; while the supporting step is in slidable contact with top surfaces of both lateral walls of the annular groove; and the ring wheel is concentrically arranged with the drive wheel and movable with respect to the drive wheel so as to attain an adjustable spread of axles with a specific speed variation;

at least one linking member having the number corresponding to the number of the bulges of the ring wheel, each linking member comprising a head portion and a linking portion, wherein the head portion has an intermediate cylindrical portion and two circular shafts located at its both ends; and the linking portion extends radially from the intermediate cylindrical portion of the head portion and has an aperture at its free end;

at least two wedge teeth having the number in relation to the number of the circular shafts of the linking member, two wedge teeth being mounted on each linking member; wherein each wedge tooth consists of first and second wedges of hinge type with circular-arc-shaped top surfaces and is muff-coupled with one circular shaft of the head portion of the linking member; when the wedge teeth are mounted on the circular shafts, each linking member is rotatably mounted in the annular recess of the drive wheel via a bearing, the linking portion of each linking member has its free end articulated with the bulges of respective ring wheel via a pintle, and the first and second wedges are expanded by a resilient member, such that the circular-arc-shaped top surfaces and inner walls of the annular recess of the drive wheel create a reverse frictional contact when the drive wheel rotates.

In the above continuously variable transmission, the drive wheel consists of two flat wheels being mounted respectively at the input shaft in a relatively spaced manner, the annular recess is relatively arranged at an inner surface near periphery of the flat wheels, and the wedge teeth on the two circular shafts of the linking member are respectively located in the annular recess of the two flat wheels.

The first and second wedges respectively have a hinge gaine and a wedge teat axially arranged at an outer circumferential surface of the gaine, wherein the hinge gaine of the first wedge is located at the middle of the wedge teat, and the second wedge has two hinge gaines respectively located at both sides of the wedge treat; and the hinge gaine at the middle could be matchably inserted into the hinge gaines at both sides, such that they are located on a common axis, while their wedge teats are opposite to each other up and down.

The wedge teat has a lateral surface which is a flat surface, and a top surface which is a circular-arc-shaped wedge surface constituted by two smoothly transited circular arcs with different radii, wherein the arcs have a radius which is relatively large at the region near the lateral surface and relatively small at the region far away from the lateral surface, the lateral surface is further provided correspondingly with a rabbet, and the resilient member is a spring bow having its two ends inserted into the rabbet, such that the first and second wedges are elastically pushed to the circular-arc-shaped wedge surfaces so as to come into contact with a inner wall of the annular recess of the drive wheel.

To attain the above object, the present invention provides another continuously variable transmission comprising:

an input shaft and an output shaft arranged in an axle seat of an external support;

a drive wheel acting as a primary wheel in round shape, which has its center hole as an axle hole for mounting the input shaft, and an annular recess arranged near its periphery;

a chain wheel acting as a driven wheel, which has its center hole as an axle hole for mounting the output shaft;

an endless sleeve consisting of an endless sleeve portion and a handle portion extending outwardly from one end of the endless sleeve portion, wherein the endless sleeve portion has an annular groove arranged on its inner circumferential surface, and a projecting lug protruding outwardly from an upper portion of its outer circumferential surface, and a fore part of the handle portion is provided with a mounting hole capable of rotatably connection with the output shaft when the endless sleeve swings;

a ring wheel which is an annular chain wheel having on its outer peripheral surface a toothed portion with a relatively large diameter convex intermediate section and a relatively recessed supporting step having its both laterals with a diameter smaller than a root circle diameter of its toothed portion, and a plurality of perforated bulges being evenly distributed on its inner peripheral surface; wherein the ring wheel is mounted in the endless sleeve portion of the endless sleeve and has its toothed portion inserted into the annular groove of the endless sleeve portion of the endless sleeve; while the supporting step is in rolling contact with top surfaces of both lateral walls of the annular groove; and the ring wheel is concentrically arranged with the drive wheel and movable with respect to the drive wheel such that its axle center and axle center of the drive wheel establish an eccentric spread of axles that is adjustable within a specific range;

at least one linking member having the number corresponding to the number of the bulges of the ring wheel, each linking member comprising a head portion and a linking portion, wherein the head portion has an intermediate cylindrical portion and two circular shafts located at its both ends; and the linking portion extends radially from the intermediate cylindrical portion of the head portion and has an aperture at its free end;

at least two wedge teeth having the number in relation to the number of the circular shafts of the linking member, two wedge teeth being mounted on each linking member; wherein each wedge tooth consists of first and second wedges of hinge type with circular-arc-shaped top surfaces and is muff-coupled with one circular shaft of the head portion of the linking member; when the wedge teeth are mounted on the circular shafts, each linking member is rotatably mounted in the annular recess of the drive wheel via a bearing, the linking portion of each linking member has its free end articulated with the bulges of respective ring wheel via a pintle, and the first and second wedges are expanded by a resilient member, such that the circular-arc-shaped top surfaces and inner walls of the annular recess of the drive wheel create a reverse frictional contact when the drive wheel rotates;

a chain mounted on chain teeth of the ring wheel and the chain wheel in an enclosing manner for driving rotation of the output shaft.

To attain the above objection, the present invention provides a still another continuously variable transmission comprising:

a support consisting of two bearer plates and a base plate;

a drive wheel having an annular recess arranged near its periphery and being rotatably mounted at an upper portion of the bearer plate by a drive wheel shaft;

a toothed wheel acting as a driven wheel, which is rotatably mounted at a lower portion of the bearer plate by an output shaft;

an endless sleeve having an annular groove arranged on its inner circumferential surface, and a projecting lug and a mounting cannula protruding outwardly and located at corresponding upper and lower portions on its outer circumferential surface, respectively;

a disk-type ring wheel which is an disk-shaped external gear having on its outer peripheral surface a toothed portion with a relatively large diameter convex intermediate section and a relatively recessed supporting step having its both laterals with a diameter smaller than a root circle diameter of its toothed portion, and a plurality of isometric sliding chutes being radially and equangularly arranged on its disk surface; wherein the disk-type ring wheel is mounted in the endless sleeve and has its toothed portion inserted into the annular groove of the endless sleeve and meshed with toothed portion of the toothed wheel at the lower portion of the support; while the supporting step is in slidable contact with top surfaces of both lateral walls of the annular groove; and the disk-type ring wheel is concentrically arranged with the drive wheel and movable with respect to the drive wheel so as to attain an adjustable spread of axles with a specific speed variation;

at least one rod-shaped linking member having the number corresponding to the number of the sliding chutes of the disk-type ring wheel, each rod-shaped linking member consisting of an intermediate cylinder portion and two circular shafts located at both ends of the intermediate cylinder portion;

at least two wedge teeth having the number in relation to the number of the circular shafts of the rod-shaped linking member, two wedge teeth being mounted on each rod-shaped linking member; wherein each wedge tooth consists of first and second wedges of hinge type with circular-arc-shaped top surfaces and is muff-coupled with one circular shaft of the head portion of the rod-shaped linking member; when the wedge teeth are mounted on the circular shafts of the rod-shaped linking member, each rod-shaped linking member is rotatably mounted in the annular recess of the drive wheel via a bearing, the intermediate cylinder portion of the rod-shaped linking member is located in the sliding chute of the disk-type ring wheel and in a movable connection against the sliding chute, and the first and second wedges are expanded by a resilient member, such that the circular-arc-shaped top surfaces and inner walls of the annular recess of the drive wheel create a reverse frictional contact when the drive wheel rotates.

The above continuously variable transmission further comprises a I-beam toothed wheel of I-beam configuration, which is mounted at another side of the lower portion of the bearer plate of the support via an input shaft and is adjacent to the toothed wheel on the output shaft, the drive wheel has two flat wheels which are external-tooth type flat wheels having external toothed portions respectively on their circumferential surfaces, and two toothed portions of the I-beam toothed wheel are respectively in gear-engagement with the external toothed portions of the external-tooth type flat wheels.

In summary, the continuously variable transmission of the present invention adopts a drive wheel, an endless sleeve, a ring wheel, at least one linking member, and wedge teeth or the like in specific forms of configuration. The drive wheel is provide with an annular recess, in which a plurality of reversal wedge teeth run, and the wedge teeth are connected with a head portion of the linking member with its linking portion connected with the ring wheel, and the spread of axles between the drive wheel and the ring wheel is adjusted via the swinging of the endless sleeve. By means of the power of the drive wheel and with the aid of the locking and releasing operations of the wedge teeth, the linking members are urged to drive the ring wheel to change the input and output transmission ratio. The transmission ratio could generally reach up to 1:1-1:5 or above. The change of the transmission ratio can be performed during the travelling of the vehicle to provide a continuously variable speed variation, with the result of a smooth ride and a reduction in fuel. The continuously variable transmission is preferably adapted for use in a bicycle, wherein the spread of axles between the ring wheel and the drive wheel is adjusted by regulating a wire, such that the magnitude of speed variation is not restricted, the variation range of the transmission ratio is large, and the power could be synchronously input during the speed variation. Thus, the transmission of the invention has the advantages of being simple in structure, easy in operation, low in noise and abrasion, small in energy loss and great in variation effect.

While the present invention will be described with reference to specific embodiments provided hereinbelow as illustrative and non-limitative examples of the present invention, it should be understood by those skilled in the art that various modifications may be made thereto without departing from the spirit and scope of the present invention. It should be also noted that like parts in the following figures will be denoted by like reference numbers for the purpose of better understanding of the present invention.

BRIEF DESCRIPTION OF THE DRAWINGS

FIG. 3 is an enlarged view of a portion A of FIG. 1;

FIG. 4 is an exploded view of a linking member and a wedge tooth as shown in FIG. 3;

FIGS. 5a and 5b are stereoscopic views of two wedges of the wedge teeth;

FIG. 6 is a planar design diagram of a circular-arc-shaped wedge surface over top surfaces of the wedges shown in FIGS. 5a and 5b;

FIG. 7 is a partial sectional view of a second embodiment of the continuously variable transmission of the present invention;

FIG. 8 is a structural schematic view of the continuously variable transmission of FIG. 7 mounted on a bicycle;

FIGS. 9a-9c are schematic views showing relations of length of travel and driving angles of the drive wheel and the ring wheel when the spread of axles thereof is altered to enable the drive wheel to drive the ring wheel driven;

DETAILED DESCRIPTION

Figure 1:
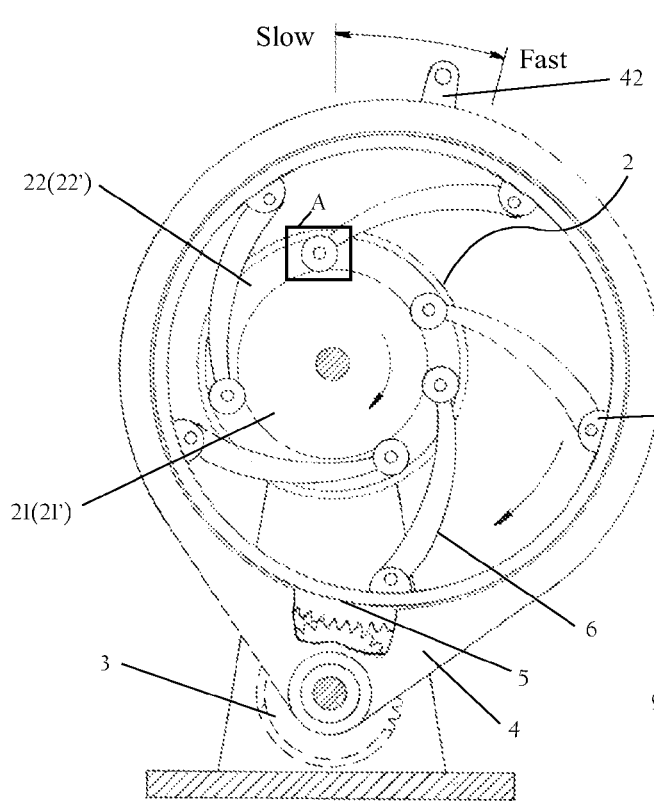
FIG. 1 is a partial sectional view of a first embodiment of a continuously variable transmission of the present invention.

Referring to FIGS. 1-6, a first embodiment of a continuously variable transmission of the present invention for motor vehicles or mechanical equipments is illustrated, comprising a support 1, a drive wheel 2, a toothed wheel 3, an endless sleeve 4, a ring wheel 5, a plurality of linking members 6, a plurality of wedge teeth 7, an input shaft 8, an output shaft 9 and a spring bow 10. The support 1 consists of two bearer plates 11 and a base plate 12, and the bearer plates 11 are vertically mounted at the base plate 12 in a parallel relation and have a pair of axle holes arranged at its upper and lower portions, respectively.

The drive wheel 2 is a primary wheel in round shape for power reception, in which an annular recess 22 is arranged near its periphery or outer circumferential surface. The drive wheel 2 is rotatably mounted at the axle hole of the upper portion of the bearer plate 11 by the input shaft 8. In a preferred embodiment, the drive wheel 2 consists of two relatively oblate flat wheels 21, 21' of the same size and shape which are mounted respectively at the input shaft 8 in relatively spaced apart relation, and a pair of opposite plane symmetric annular recesses 22, 22' are arranged at an inner surface near the periphery or the outer circumferential surface of the drive wheel 2. As the drive wheel 2 is fastened to the input shaft 8, the flat wheels 21, 21' are always in synchronous rotation.

The toothed wheel 3 is a driven wheel which is an external gear. The toothed wheel 3 is rotatably and firmly mounted at the axle hole of the lower portion of the bearer plate 11 by the output shaft 9.

The endless sleeve 4 is a driving element for the purpose of swinging and has an annular groove 41 arranged on its inner circumferential surface, and a projecting lug 42 and a mounting cannula 43 respectively protruding outwardly and located at corresponding upper and lower portions on its outer circumferential surface. The mounting cannula could be devised to be connected with the annular groove 41, and is muff-coupled with the output shaft 9 to enable the endless sleeve 4 to rotate about the output shaft in a swinging manner to change indirectly the eccentric spread of axles between the drive wheel and the ring wheel while the projecting lug 42 is pushed or pulled back and forth by an external force, which will be detailed hereinbelow.

The mounting cannula 43 of the endless sleeve can include two short cannulas in spaced apart relation and coaxially arranged at opposite sides of the outer wall of the annular groove 41, and correspondingly, the output shaft 9 is provided with a pair of radially spaced flanges 91, 91' arranged against the inner wall of the bearer plate 11. In this way, the pair of flanges 91, 91' are rotatably connected with the inner wall of the mounting cannula 43 or the inner walls of the two short canulas, such that the rotation of the output shaft 9 allows for urging the projecting lug 42 to enable the endless sleeve 4 to swing smoothly to a given angle. In addition, the spaced arrangement of the mounting cannula 43 provides a space for rotation of the toothed wheel 3.

The ring wheel 5 is an annular external gear, which has, on its peripheral surface or outer circumferential surface, a gear face or toothed portion 51 having a relatively large diameter convex intermediate section, and a supporting step 52 having two relatively small diameter laterals and recessed with respect to the gear face, i.e. the diameter of the laterals is smaller than the root circle diameter of the toothed portion. The ring wheel 5 also has five perforated mounting bulges 53 evenly distributed or arranged on five equipartition portions of its inner peripheral surface or inner circumferential surface. The ring wheel 5 is mounted in the endless sleeve 4 acting as a swinging element, and has its toothed portion 51 inserted into the annular groove of the endless sleeve and meshed with toothed portion of the toothed wheel 3 at the lower portion of the support 1 while being opposite to the gaps between the walls of the groove. The supporting step 52 of the ring wheel 5 is in rolling contact with the top surfaces of both lateral walls of the annular groove 41. In the present invention, the ring wheel 5 is concentrically arranged with the drive wheel 2, and can move with respect to the drive wheel 2 when the endless sleeve 4 rotates, such that their axle centers offset from each other to form an eccentric spread of axles that is adjustable within a specific range. As stated above, the supporting step 52 of the ring wheel 5 and the top surfaces of both lateral walls of the annular groove 41 of the endless sleeve 4 are in the rolling contact by use of a pair of swinging roller bearings 60 mounted between the step and the top surface.

The linking member 6 and the bulges of the ring wheel 5 are provided in equal numbers, which amounts to five. Each linking member comprises a head portion 61 and a linking portion 62. The head portion 61 has an intermediate cylindrical portion 63 and circular shafts 65 located at both ends of the head portion. The linking portion 62 extends radially from the intermediate cylindrical portion 63 of the head portion 61 and has an aperture at its free end. The linking portion 62 of the linking member is of a circular-arc configuration and bends in the same direction as the annular recesses 22, 22'.

Referring again to FIGS. 5 and 6, the number of wedge teeth 7 is ten, which is 2 times of the number of the bulges of the ring wheel. That is, on each linking member two wedge teeth are mounted, and each wedge tooth 7 consists of first and second wedges 71, 72 of hinge type with circular-arc-shaped top surfaces. As the wedges 71, 72 are joined like hinges of a door or window, they are muff-coupled together with the circular shaft 65 of the head portion 61 of the linking member acting as a hinge axis. After the mounting of the wedge teeth 7 on all the circular shafts 65 of the linking member, the linking members are rotatably mounted one by one in the annular recesses 22, 22' by means of a bearing 64. The free end of the linking portion 62 of each linking member is articulated with the bulges 53 of the respective ring wheel by means of a pintle. The first and second wedges 71, 72 of each wedge tooth is expanded by a resilient member 10, and the distance between their rotation center and the circular-arc-shaped top surfaces is slightly larger than the relative spacing of the inner walls of the annular recesses of the drive wheel, such that the circular-arc-shaped top surfaces and the inner walls of the annular recesses create a reverse frictional contact when the drive wheel rotates. In the present embodiment, the first and second wedges 71, 72 respectively have a hinge gaine and wedge teats 73, 74 axially arranged at outer circumferential surfaces of the gaine. The hinge gaine 75 of the first wedge is located at the middle of the wedge teat, and the second wedge has two hinge gaines 76, 77 located at both sides of the wedge teat. The hinge gaine 75 at the middle could be matchably inserted into the hinge gaines 76, 77 at both sides, such that they are aligned with a common axis, while their wedge teats 73, 74 are opposite to each other up and down.

The lateral surfaces 78, 78' of the wedge teat are planar, and the top surfaces are circular-arc-shaped wedge surfaces 79, 79' formed by two smoothly transited circular arcs with different radii A, B. The arcs have a radius which is relatively large and relatively small at the region near and far away from the lateral surfaces, respectively. Rabbets 90, 90' are further provided on the lateral surfaces 78, 78', and the resilient member is a spring bow 10 with its two ends inserted into the rabbets 90, 90' such that the first and second wedges 71, 72 are elastically pushed to the circular-arc-shaped wedge surfaces and in contact with the inner walls of the annular recesses 22, 22' of the drive wheel 2.

If desired, the present invention further comprises a jogger (not shown) having its one end connected with an opening of the projecting lug 42 of the endless sleeve and its another end connected with a control assembly outside the transmission (not shown).

Referring to FIGS. 7 and 8 in conjunction with FIGS. 2-6, a second embodiment of the continuously variable transmission of the present invention adapted for a bicycle is shown. The continuously variable transmission comprises a drive wheel 2, a chain wheel 30, an endless sleeve 40, a ring wheel 50, a plurality of linking members 6, a plurality of wedge teeth 7, an input shaft 8, an output shaft 9, a spring bow 10 and a chain 80. Obviously, This embodiment is similar in structure, number and connection of the components other than the chain wheel 30, the endless sleeve 40, the ring wheel 50 and the chain 80 to that disclosed in the first embodiment, which will be omitted herein. Moreover, the support 1 of the first embodiment is now replaced by a bicycle frame in this embodiment. It is known that the bicycle frame has a lower portion provided usually with an axle seat or axle holes for the mounting of an intermediate axle, a front axle and a rear axle, which are not the essence of the invention and will be excluded from the invention. What the invention is concerned is how to mount the continuously variable transmission of the invention onto the axle seats of the intermediate and rear axles. In this way, the first different component employed in the second embodiment, the chain wheel 30, is a driven wheel having a center hole as an axle hole for coupling with the output shaft 9.

The endless sleeve 40 is a driving element for the purpose of swinging which is functionally similar to the endless sleeve 4 of the first embodiment but differs in structure. The endless sleeve 4 consists of an endless sleeve portion 401 and a handle portion 402 extending outwardly from and integrally with one end of the endless sleeve portion 401. The endless sleeve portion 401 has an annular groove arranged on its inner circumferential surface (having the same structure as the endless sleeve 4 of the first embodiment but not shown in FIG. 7), and a projecting lug 404 protruding outwardly from an upper portion of its outer circumferential surface. The handle portion 402 has a fore part on which a mounting hole 405 capable of rotatably connection with the output shaft is provided. The endless sleeve 40 is mounted on the output shaft 9 through the mounting hole 405, enabling the endless sleeve 40 to rotate in a swinging manner about the output shaft 9 when the projecting lug 404 is pushed or pulled back and forth by an external force.

The ring wheel 50 is a hollow annular chain wheel on the bicycle, which is similar to the ring wheel 5 of the first embodiment but differs in teeth. For example, the ring wheel 5 comprises, on its outer circumferential surface, a toothed portion with a relatively large diameter convex intermediate section and a relatively recessed supporting step 512 having its both laterals with a diameter smaller than the root circle diameter of the toothed portion. The ring wheel 5 further comprises five perforated bulges evenly distributed on its inner circumferential surface.

The ring wheel is mounted concentrically in the endless sleeve with its toothed portion inserted into the annular groove of the endless sleeve portion 401 of the endless sleeve. While the supporting step of the ring wheel is in rolling contact with the top surfaces of both lateral walls of the annular groove, and the ring wheel is concentrically arranged with the drive wheel and movable with respect to the drive wheel such that their axle centers establish an eccentric spread of axles that is adjustable within a specific range. When the endless sleeve 40 rotates about the output shaft 9 in a swinging manner, the ring wheel would be driven to rotate together whereby changing the eccentric spread of axles between the drive wheel 2 and the ring wheel.

The chain 80 is a bicycle chain mounted on and surrounding the chain teeth of the ring wheel 50 and the chain wheel 30 to drive the rotation of the output shaft 9.

The continuously variable transmission of the first embodiment of the present invention operates on the basis of the principles as follows. In the operation, the drive wheel 2 mounted at the input shaft 8 is driven by an external rotary force to rotate in a clockwise direction (as denoted by the arrow in FIG. 1). If the eccentric spread of axles between the drive wheel 2 and the ring wheel 5 at the startup is 0 (as shown in FIG. 9c), the wedge teeth 7 are evenly spaced apart on the circumference where the included angle between the ring wheel and the drive wheel is 72°, in the annular recesses 22, 22' near the periphery of the drive wheel, the two wedges 71, 72 of each wedge tooth expanded by the same spring bow 10 are subject to a resilient force such that the circular-arc-shaped wedge surfaces 79, 79' of the top surface of the wedges lean against the opposite wall surfaces of the annular recesses 22, 22'. The circular-arc-shaped wedge surfaces and the wall surfaces of the annular recesses constitute a reverse frictional contact due to the clockwise rotation of the drive wheel. Therefore, the distance between the circular-arc-shaped wedge surfaces 79, 79' for all wedge teeth 7 are increased from small to large, allowing for forcing the wedges 71, 72 to come intimately contact with the annular recesses until they are locked up, and then driven by the drive wheel 2 to travel the same length as the ring wheel 5 urged by the linking portion 62, at this point, the ratio of rotation speed of the ring wheel to the rotation speed of the drive wheel 2 is 1:1.

Thereafter, urging the projecting lug 42 enables the endless sleeve 4 to rotate about the output shaft 9 to a specific angle (as shown in FIG. 9). Under the action of the endless sleeve 4, the axle center of the ring wheel 5 moves away from the axle center of the drive wheel 2, and the eccentric spread of axles of the drive wheel 2 and the ring wheel 5 is changed from 0 to n.

During the rotation of the drive wheel, the wedge teeth 7 in the annular recess are no longer evenly distributed on the circumference, and the circumferential distance between the two wedge teeth which are the closest to the ring wheel 5 is decreased, where the included angle between the ring wheel and the drive wheel is 48°. At this point, these two wedge teeth are the closest to the axle center of the ring wheel and reach momentarily a mutual lockup state. Because they are in the same rotation, the rotation speed near the axle center is slower than the rotation speed at the position which is away from the axle center, such that the wedge teeth, which are the closest to the axle center of the ring wheel, would be automatically selected to be locked up when the drive wheel rotates, and the ring wheel 5 is driven to rotate by urging the linking portion 62. It should be noted that these two wedge teeth are momentarily locked up at the same time, because they are in an alternate state. After slightly moving forward, the wedge teeth in front would gradually move away from the axle center and the locking is released. The linking portion of the linking member urges the ring wheel 5 to move by the wedge teeth in the rear which is locked in the annular recess; while other wedge teeth are driven by the ring wheel 5 in motion and the linking portion 62 to travel along the annular recess, and they sequentially move away from the axle center of the ring wheel, and then gradually move toward the axle center of the ring wheel again, such that the wedge teeth are alternately locked up, and at this point, the ratio of the rotation speed of the drive wheel 2 to the rotation speed of the ring wheel 5 is 1:1.5.

By continuously urging the projecting lug 42, the endless sleeve 4 will rotate about the output shaft 9 to a much larger angle (as shown in FIG. 9, the included angle between the ring wheel and the drive wheel is 24°), following the above principle, the movement of the endless sleeve 4 allows the ring wheel 5 to correspondingly move a distance with its axle center being deviated more from the axle center of the drive wheel 2, thereby the eccentric spread of axles of the drive wheel 2 and the ring wheel 5 reaches s. At this point, the ratio of the rotation speed of the drive wheel 2 to the rotation speed of the ring wheel 5 is 1:3.

The drive wheel 2 and the ring wheel 5 are designed to be in an eccentric state, and the drive wheel is forced to rotate by applying power thereto, while the ring wheel receives the power from the drive wheel under different spread of axles. When the drive wheel rotates in the clockwise direction, the annular recess of the drive wheel and the wedge teeth would correspondingly generate a reverse friction, such that the wedge teeth in closest proximity to the axle center of the ring wheel move slower than the wedge teeth far away from the axle center of the ring wheel, and would be locked up and move synchronously with the drive wheel. While other wedge teeth are driven by the ring wheel via the linking member to move sequentially away from and then gradually move toward the axle center of the ring wheel. The wedge teeth are locked up and released alternately to realize a continuously variable speed transmission.

The ingenious integration and association of the drive wheel, the wedge teeth, the linking members and the ring wheel allow for the change of the spread of axles between the drive wheel and the ring wheel with the aid of the swinging of the endless sleeve during the motion of the drive wheel (the design that the swinging of the ring wheel enables the drive wheel to swing is desirable in the invention). In the invention, the moment of force and the rotation speed can be arbitrarily changed and continuously variable. When the drive wheel and the ring wheel are concentrically running, they are in the same revolution in which the larger the spread of axles between the drive wheel and the ring wheel is, the larger the transmission ratio and the revolution difference are.

Figure 2:
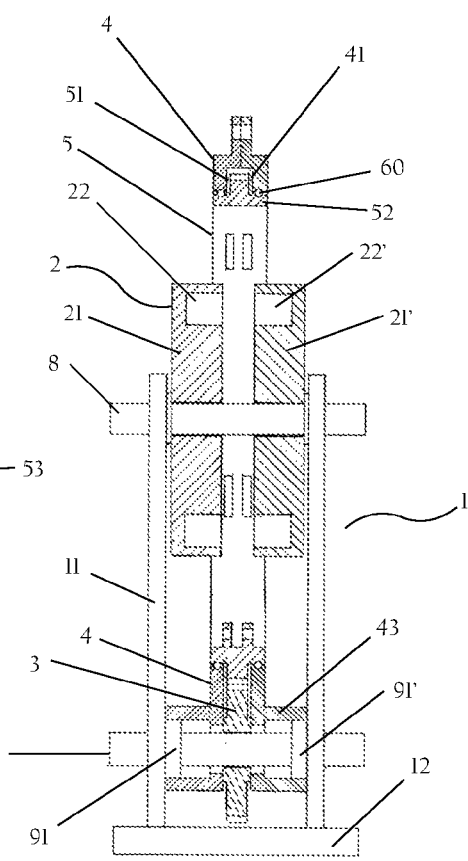
FIG. 2 is a side sectional view of FIG. 1.

The drive wheel and the ring wheel are supposed to be in the state as shown in FIG. 1 or 2, their transmission ratio is 1:3.5, if the spread of axles between the drive wheel and the ring wheel is maximized. FIGS. 9a-9c illustrate the change of the spread of axles between the drive wheel and the ring wheel. In the case that the ring wheel is driven by the drive wheel to travel by 24°, 48°, and 72°, the speed ratio thereof is 1:3, 1:1.5 and 1:1, respectively with respect to the same traveling of 72°.

The continuously variable transmission adapted for the bicycle described in the second embodiment is similar in operation and principle to the first embodiment, even there still exists slight differences therebetween in structure. For example, the linking member and the annular recess of FIG. 7 are in an 180° reverse connection, such that the linking member can drive the ring wheel when a force is applied to the linking member. This design has the advantage that the linking member can be made to be more lightweight and more suitable for the bicycle. The only difference is that in this embodiment, the ring wheel is driven indirectly by the chain wheel through the chain, which is unlike the direct transmission between the ring wheel and toothed wheel described in the first embodiment.

Figures 10, 11:
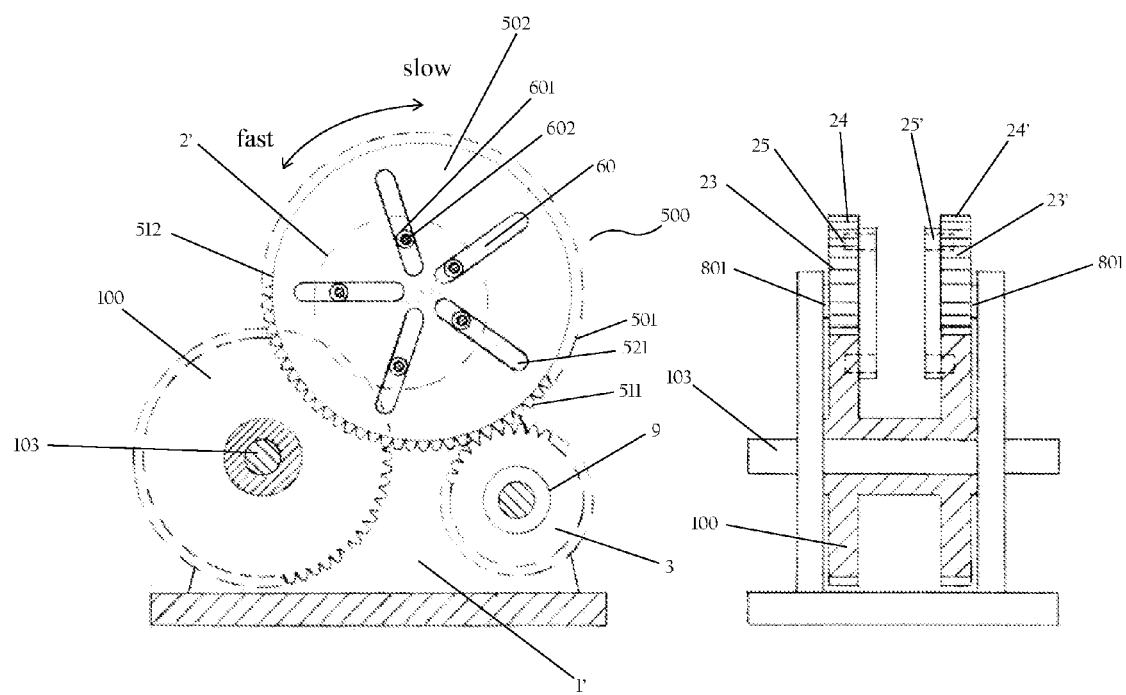
FIG. 10 is a partial sectional view of a third embodiment of the continuously variable transmission of the present invention showing that the endless sleeve is removed therefrom.
FIG. 11 is a side sectional view of FIG. 10, showing the meshing engagement of the drive wheel and the I-beam toothed wheel.

Referring to FIGS. 10 and 11 in conjunction with FIGS. 1-6, a third embodiment of the continuously variable transmission of the present invention is shown in FIGS. 10 and 11, which is adapted for use in motor vehicles or mechanical equipments as the transmission described in the first embodiment. However, the difference therebetween is that the drive wheel drives a disk-type ring wheel via rod-shaped linking members in this embodiment, while the drive wheel drives the ring wheel via the linking members in the first embodiment.

In the third embodiment, the continuously variable transmission comprises a support 1', a drive wheel 2', a toothed wheel 3, an endless sleeve 4, a disk-type ring wheel 500, a plurality of rod-shaped linking members 60, a plurality of wedge teeth 7 and a spring bow 10. It should be noted that this embodiment only have the disk-type ring wheel 500 and the rod-shaped linking members 60 that are different from the above embodiments, which will be detailed hereinbelow.

Moderate modifications of the support 1' and the drive wheel 2' have been made in dimension, mounting and connection manners so as to be adapted for the external requirements. The other parts including the swinging roller bearing mounted between the ring wheel and the endless sleeve remain the same as in the first embodiment in terms of their structure, number and connection manner, which is omitted here and for details reference can be made to the description of the first embodiment.

As stated above, one of the differences between the third embodiment and the above embodiments is the disk-type ring wheel 500, which is a disk-shaped external gear, and comprises a peripheral surface 501 and a disk surface 502. Like the first embodiment, on the peripheral surface 501 there exists a toothed portion 511 having a relatively large diameter convex intermediate section, and a relatively recessed supporting step 512 having its both laterals with a diameter smaller than the root circle diameter of the toothed portion. On the disk surface 502 a plurality of isometric sliding chutes 521 are radially and equangularly arranged. The disk-type ring wheel 500 is mounted on the endless sleeve 4 (not shown, reference is made to FIGS. 1 and 2 for details), and has its toothed portion 511 inserted into the annular groove 41 of the endless sleeve 4 and meshed with the toothed portion of the toothed wheel 3 at the lower portion of the support 1'. The supporting step 512 is in slidable contact with the top surfaces of both lateral walls of the annular groove 41. Moreover, the disk-type ring wheel 500 is concentrically arranged with the drive wheel 2' and movable with respect to the drive wheel 2' to form an adjustable spread of axles with a specific transmission ratio. Preferably, the sliding chutes of the disk-type ring wheel 500 one of the ends adjacent to the center O of the ring wheel, and another ends adjacent to the toothed portion of the ring wheel.

Another difference between this embodiment and the first embodiment is the rod-shaped linking member 60, which has the number corresponding to the number of the sliding chutes 521 of the disk-type ring wheel. Each of the rod-shaped linking members consists of an intermediate cylinder portion 601 and two circular shafts 602 located at both ends of the intermediate cylinder portion. Like the first embodiment, two wedge teeth each consisting of first and second wedges of hinge type with circular-arc-shaped top surfaces are mounted on the circular shaft of the rod-shaped linking member 60, and arranged rotatably in the annular recess of the drive wheel through the muff-coupling to a bearing outside the wedge teeth. The intermediate cylinder portion 601 of the rod-shaped linking member is located snugly in the sliding chutes 521 of the disk-type ring wheel and establishes a relatively movable transmission connection with the sliding chutes. In the annular recess of the drive wheel 2', the first and second wedges are expanded by a resilient member to create a reverse frictional contact between their circular-arc-shaped top surfaces and the inner walls of the annular recess when the drive wheel 2' rotates.

On the other hand, in the present embodiment, the support 1' consists of two bearer plates and a base plates, but has to been enlarged in dimension such that the power input is not limited to the drive wheel. Further, the drive wheel 2' is modified to be an external-tooth type wheel, which has an external toothed portion on its circumferential surface, and is made to act as a driven wheel. In this way, the two flat wheels constituting the drive wheel are two external-tooth type flat wheels 24, 24' each having external toothed portions 23, 23' and firmly attached to the axle 801 of the drive wheel in a spaced manner. The annular recesses 25, 25' are respectively arranged on the inner surfaces near the periphery of the external-tooth type flat wheels 24, 24', and the wedge teeth on the two circular shafts of the rod-shaped linking members 60 are respectively located in the annular recesses 25, 25' of the external-tooth type flat wheels. The continuously variable transmission of this embodiment further comprises a I-beam toothed wheel 100 of I-beam configuration mounted at the lower portion of another side of the bearer plate of the support 1' adjacent to the toothed wheel 3 on the output shaft 9 by means of the input shaft 103, with its two toothed portions 101, 102 being respectively in gear-engagement with the external toothed portions 23, 23' of the external-tooth type flat wheels.

When compared with the operation of the first embodiment, the rod-shaped linking member 60 and disk-type ring wheel 500 of the continuously variable transmission described in the third embodiment are functionally same as the linking member and the ring wheel of the first embodiment, though the rod-shaped linking member 60 and the disk-type ring wheel 500 have been structurally modified, for example, the linking portion of the linking member 6 of the first embodiment is absent from the rod-shaped linking member 60, and the disk-type ring wheel is further provided with a disk surface 502 on which the sliding chutes 521 are arranged to enable the rod-shaped linking members 60 to move up and down therein. That is, the sliding chutes in fact correspond to the linking portion of the linking member 6 of the first embodiment. In operation, when the drive wheel 2' is driven to rotate by the I-beam toothed wheel 100, the rod-shaped linking member 60 can receive the power under different spread of axles between the drive wheel 2' and the disk-type ring wheel 500 to drive the running of the wedge teeth along the annular recess. This is because, when each pair of wedge teeth are respectively mounted on the circular shafts of the rod-shaped linking member 60 and then fitted into the annular recess of the drive wheel, the intermediate cylindrical portion of the rod-shaped linking member is located in the radial sliding chute 521 of the disk-type ring wheel as a roller. In the case that the drive wheel and the disk-type ring wheel 500 are eccentrically in a specific spread of axles, the roller would have the annular recess of the drive wheel to act as a circumference and positioned at different radial positions along the sliding chute of the disk-type ring wheel. When the drive wheel rotates, the pair of wedge teeth in the closest proximity to the axle center of the ring wheel or the pair of wedge teeth on the circular shafts at both ends of the roller, which are the closest to the axle center, would be locked up to rotate synchronously, along with the rotation of the disk-type ring wheel driven by the roller. The other wedge teeth would be driven by the disk-type ring wheel via the sliding chutes to move along the sliding chutes sequentially away from and then gradually move toward the axle center of the disk-type ring wheel. The wedge teeth are locked up and released alternately to realize a continuously variable speed transmission.

What is claimed is:

1. A continuously variable transmission, comprising:
an input shaft and an output shaft arranged in an axle seat of an external support;
a drive wheel acting as a primary wheel in round shape, which has its center hole as an axle hole for mounting the input shaft, and an annular recess arranged near its periphery;
a chain wheel acting as a driven wheel, which has its center hole as an axle hole for mounting the output shaft;
an endless sleeve consisting of an endless sleeve portion and a handle portion extending outwardly from one end of the endless sleeve portion, wherein the endless sleeve portion has an annular groove arranged on its inner circumferential surface, and a projecting lug protruding outwardly from an upper portion of its outer circumferential surface, and a fore part of the handle portion is provided with a mounting hole capable of rotatably connection with the output shaft when the endless sleeve swings;
a ring wheel which is an annular chain wheel having on its outer peripheral surface a toothed portion with a relatively large diameter convex intermediate section and a relatively recessed supporting step having its both laterals with a diameter smaller than a root circle diameter of its toothed portion, and a plurality of perforated bulges being evenly distributed on its inner peripheral surface; wherein the ring wheel is mounted in the endless sleeve portion of the endless sleeve and has its toothed portion inserted into the annular groove of the endless sleeve portion of the endless sleeve; while the supporting step is in rolling contact with top surfaces of both lateral walls of the annular groove; and the ring wheel is concentrically arranged with the drive wheel and movable with respect to the drive wheel such that its axle center and axle center of the drive wheel establish an eccentric spread of axles that is adjustable within a specific range;
at least one linking member having the number corresponding to the number of the bulges of the ring wheel, each linking member comprising a head portion and a linking portion, wherein the head portion has an intermediate cylindrical portion and two circular shafts located at its both ends; and the linking portion extends radially from the intermediate cylindrical portion of the head portion and has an aperture at its free end;
at least two wedge teeth having the number in relation to the number of the circular shafts of the linking member, two wedge teeth being mounted on each linking member; wherein each wedge tooth consists of first and second wedges of hinge type with circular-arc-shaped top surfaces and is muff-coupled with one circular shaft of the head portion of the linking member; when the wedge teeth are mounted on the circular shafts, each linking member is rotatably mounted in the annular recess of the drive wheel via a bearing, and the linking portion of each linking member has its free end articulated with the bulges of respective ring wheel via a pintle, and the first and second wedges are expanded by a resilient member, such that the circular-arc-shaped top surfaces and inner walls of the annular recess of the drive wheel create a reverse frictional contact when the drive wheel rotates;
a chain mounted on chain teeth of the ring wheel and the chain wheel in an enclosing manner for driving rotation of the output shaft.

2. The continuously variable transmission of claim 1, wherein the drive wheel consists of two flat wheels being mounted respectively at the input shaft in a relatively spaced manner, the annular recess is relatively arranged at an inner surface near periphery of the flat wheels, and the wedge teeth on the two circular shafts of the linking member are respectively located in the annular recess of the two flat wheels.

3. The continuously variable transmission of claim 1, wherein the first and second wedges respectively have a hinge gaine and a wedge teat axially arranged at an outer circumferential surface of the gaine, the hinge gain of the first wedge is located at the middle of the wedge teat, and the second wedge has two hinge gaines located at both sides of the wedge treat, respectively; and the hinge gain at the middle is matchably inserted into the hinge gaines at both sides, such that they are located on a common axis, while their wedge teats are opposite to each other up and down.

4. The continuously variable transmission of claim 1, wherein the wedge teat of each wedge has a lateral surface which is a flat surface, and a top surface which is a circular-arc-shaped wedge surface constituted by two smoothly transited circular arcs with different radii, wherein the arcs have a radius which is relatively large at the region near the lateral surface and relatively small at the region far away from the lateral surface, the lateral surface is further provided correspondingly with a rabbet, and the resilient member is a spring bow having its two ends inserted into the rabbet, such that the first and second wedges are elastically pushed to the circular-arc-shaped wedge surface so as to come into contact with an inner wall of the annular recess of the drive wheel.

5. The continuously variable transmission of claim 1, wherein the output shaft is provided with a radially spaced flange which is rotatably connected with a hole wall of the mounting hole.

6. The continuously variable transmission of claim 1, further comprising a regulating wire having its one end connected with the hole of the projecting lug of the endless sleeve and its another end connected with a control assembly located outside the transmission which is capable of pulling the endless sleeve and elastically retracting, such that a distance between an axle center of the endless sleeve and the axle center of the drive wheel is continuously changed along with the pulling and releasing of the regulating wire.

7. The continuously variable transmission of claim 1, wherein the supporting step of the ring wheel and the top surfaces of both lateral walls of the annular groove of the endless sleeve are in rolling contact by use of a pair of swinging roller bearings.

8. The continuously variable transmission of claim 1, wherein the linking portion of the linking member is circular arc in shape.

* * * * *